April 18, 1933.   W. H. T. HOLDEN ET AL   1,903,999
REGULATING SYSTEM
Filed June 16, 1930
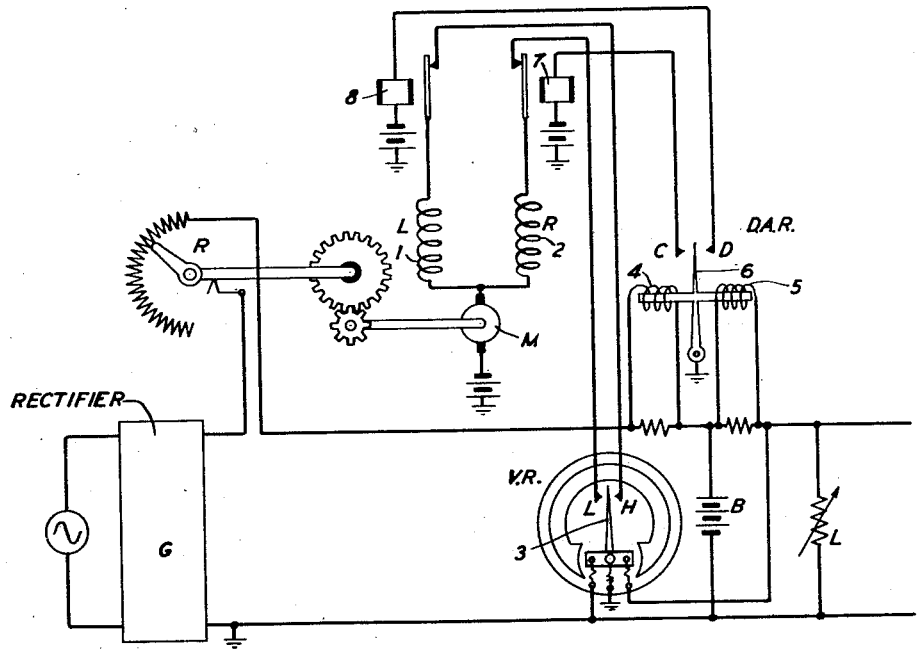
INVENTORS  W.H.T. HOLDEN
R. P. JUTSON
BY John A. Hall
ATTORNEY Patented Apr. 18, 1933 1,903,999

UNITED STATES PATENT OFFICE

WILLIAM H. T. HOLDEN, OF BROOKLYN, AND ROBERT P. JUTSON, OF YONKERS, NEW YORK; SAID HOLDEN ASSIGNOR TO AMERICAN TELEPHONE AND TELEGRAPH COMPANY, A CORPORATION OF NEW YORK, AND SAID JUTSON ASSIGNOR TO BELL TELEPHONE LABORATORIES, INCORPORATED, OF NEW YORK, N. Y., A CORPORATION OF NEW YORK

REGULATING SYSTEM

Application filed June 16, 1930. Serial No. 461,415.

This invention relates to current regulating systems and more particularly to an arrangement for automatically controlling the charging current of an electric storage battery system whereby the voltage of the battery is maintained within close limits under widely varying load conditions.

Broadly stated, an object of this invention, therefore, is to effect such automatic control in an efficient and positive manner.

In telephone central offices where storage batteries are employed for voice transmission, signaling and other miscellaneous purposes which require that the voltage at the load shall vary within very narrow limits, the current drain on the battery varies widely during 24 hours and a satisfactory automatic charging arrangement is very desirable if not imperative.

Systems responsive solely to changes in the battery voltage, for decreasing or increasing the charging current, have been proposed and used to some extent, but due to the inherent inertia of a battery to changes in the charge or discharge rate, these systems have not been entirely satisfactory for use where the load varies between rather wide limits.

A feature of the invention, resides in means to automatically regulate the battery charging current so that it will be a desired amount less than the load when the battery voltage attains a predetermined high voltage occasioned by a reduction of the load and will be a desired amount greater than the load when the battery voltage attains a predetermined low value occasioned by an increase in the load.

Another feature of the invention effected by the aforesaid means is to prevent the regulator system from "hunting" to obtain a balance, occasioned by the inherent inertia of the battery, that is, the prevention of a too rapid change cycle in the charging current between maximum and minimum output.

The invention will be understood from the following description when read in connection with the accompanying drawing which represents one embodiment thereof in which L is a varying load which is adapted to be supplied with direct current by a constantly operating alternating current rectifier G having in series with its output circuit a motor operated rheostat or resistance R controlled by a reversible motor M having two oppositely wound series coils 1 and 2. B is a storage battery adapted to "float" across the load circuit between the rectifier and the load for the purpose of maintaining a substantially uniform potential at the load under widely varying load current conditions. This battery also serves as an emergency power source in case of failure of the rectifier or its alternating source of supply. VR is a two point voltmeter relay connected across the battery which is at all times energized thereby but under normal conditions, i. e., when the battery is at normal voltage, its movable element or armature 3 stands midway between the contacts L and H and is in contact with neither one. DAR is a differential ammeter relay having one of its windings 4 effectively in series with the output of the rectifier G between the rectifier and the battery and its other winding 5 effectively in series with the load and between the battery and load.

Under normal conditions the battery "floats" across the load circuit, that is, the rectifier output at the battery terminals is substantially equal to the load and consequently windings 4 and 5 of DAR balance each other and the armature 6 stands midway between the contacts D and C and is in contact with neither one.

When the battery is receiving a small charge, the armature 6 is in contact with C an when the battery is delivering a small discharge to the load the armature is in contact with D.

With this brief description of the apparatus, it is believed that the invention will be clearly understood from the following description of the operation of the system.

If at the start we assume a balanced condition between the rectifier output and the load current, and the load current suddenly falls off materially, it will be obvious that the rectifier will then begin to charge the battery B and there will immediately exist an unbalance condition between the coils 4 and 5 of ammeter relay DAR in favor of coil 4 whereupon armature 6 makes contact at C and operates relay 7 which, however, has no effect at this time other than to open the energizing circuit of coil 2 of motor M thereby preventing the motor from being operated to reduce the resistance of rheostat which would further increase the unbalance already existing between the charging and load currents.

The battery B under this condition continues to charge until its voltage has risen to a predetermined point above its normal value, whereupon armature 3 of voltmeter VR moves to the right and contacts with H, thereby closing an energizing circuit for winding L of the motor M which is so connected in the circuit that it causes the motor to rotate the rheostat brush in a counter-clockwise direction, thereby increasing the resistance of the rectifier output circuit and decreasing the current now charging the battery. The motor continues to operate to reduce the rectifier output until the current is a small amount less than the load current whereupon the unbalance between the coils 4 and 5 of relay DAR is reversed and armature 6 then moves to the right and contacts with D, thereby closing the circuit to operate relay 8 which stops the motor and the movement of the rheostat brush by opening the motor circuit.

Battery B is now permitted to slowly dissipate its overcharge by discharging into the load until its voltage falls back to normal at which time the voltmeter relay VR returns its armature to the mid position and opens the contacts H. The battery continues to discharge until its voltage falls below normal a predetermined amount, at which time the voltmeter relay VR makes at L, thereby energizing coil 2 of motor M to operate it in the reverse direction which decreases the resistance in the rectifier output circuit until the rectifier is supplying a slightly greater current than that required by the load at which time the ammeter relay DAR is again unbalanced in favor of coil 4, which attracts its armature 6 thereby closing the contact C and operating relay 7 which stops the motor. The battery continues to charge as before until its voltage rises to a point, to cause armature 3 of VR to make contact H whereupon the previously described cycle is repeated. Load variations, either up or down, merely accelerate this cycle.

By the use of this differential ammeter relay arrangement the storage battery is slowly charged and discharged as required, thereby keeping the voltage within normal limits independent of the load fluctuations. It also prevents hunting of the regulator system to find a balance as, without it, should the rectifier output be allowed to increase until the voltmeter broke its L contact, the inertia with which the storage battery responds to changes in charge or discharge would result in the operation of the rectifier, first at full and then at minimum output, or vice versa, thereby causing an undesirable rapid cycle of operation which would overload the rectifier.

While a rectifier having a variable resistance in its output circuit is shown in the drawing similar arrangements employing a dynamo electric generator could be used equally as well in which case the motor operated rheostat would preferably be included in the field of the generator instead of in the output circuit.

What is claimed is:

1. In a battery charging system, in combination, a battery, a source of current for charging the battery and associated therewith, a variable resistance in series with said source, a load circuit connected across the terminals of said battery, a reversible motor for varying said resistance, means connected with said battery controlled solely by changes in voltage thereof, and a differential ammeter relay having one winding in series with the charging circuit and the other winding in series with the load, said voltage responsive means and differential relay acting jointly to control the motor to prevent more than a predetermined current unbalance between the two windings of said differential relay.

2. In a battery charging system, a battery, a load circuit associated therewith, a source of current connected to said battery and load circuit, means for varying the output of said source, means including circuits closed by a voltmeter relay connected to the battery for controlling said first means and a differential ammeter relay controlled by an unbalance between the current output of said source and the load current to open one or the other of said circuits.

3. In a battery charging system, in combination, a source of direct current, a load circuit, a circuit interconnecting them, a storage battery connected across said interconnecting circuit between said source and load circuit, regulating means adapted to operate in either one of two directions to increase or decrease the current output of said source, a two-contact voltage responsive relay associated with said load circuit and adapted to close one of its contacts on a predetermined high voltage and the other contact on a predetermined lower voltage, a circuit connecting said contacts and said regulating means to control the operation of said regulating means to increase the current output of said source in response to closure of the low contact of said voltage relay and to decrease the output upon closure of the high contact of the voltage relay and a differential ammeter relay jointly associated with said load circuit and with said connecting circuit between said source and battery, said differential relay being arranged to open the low contact circuit of said voltage relay when the current in said load circuit is lower than the current output of said source and to open the high contact circuit of the voltmeter relay when the load current is higher than the current output of said source.

In witness whereof, we hereunto subscribe our names this 14th day of June, 1930.

WILLIAM H. T. HOLDEN.
ROBERT P. JUTSON.